(12) United States Patent
Fujimine et al.

(10) Patent No.: US 6,835,151 B2
(45) Date of Patent: Dec. 28, 2004

(54) OIL PRESSURE CONTROL DEVICE OF AUTOMATIC TRANSMISSION

(75) Inventors: Takuya Fujimine, Anjo (JP); Akira Fukatsu, Anjo (JP); Kazuyuki Noda, Anjo (JP); Masahiko Ando, Anjo (JP); Kazutoshi Nozaki, Toyota (JP); Toshiki Kanada, Toyota (JP); Yuji Kashihara, Toyota (JP)

(73) Assignees: Aisin AW Co., Ltd. (JP); Toyota Jidosha Kabushiki Kaisha (JP)

( * ) Notice: Subject to any disclaimer, the term of this patent is extended or adjusted under 35 U.S.C. 154(b) by 0 days.

(21) Appl. No.: 10/602,023

(22) Filed: Jun. 24, 2003

(65) Prior Publication Data

US 2004/0067810 A1 Apr. 8, 2004

(30) Foreign Application Priority Data

Jun. 28, 2002 (JP) ........................................ 2002-191522

(51) Int. Cl.⁷ ........................... F16H 31/00; F16H 61/26
(52) U.S. Cl. ..................... 475/116; 475/127; 477/130
(58) Field of Search .................................. 475/114, 116, 475/127–8; 477/127, 130

(56) References Cited

U.S. PATENT DOCUMENTS

| 5,288,279 A | * | 2/1994 | Sakai et al. ................. 475/127 |
| 5,487,708 A | * | 1/1996 | Marusue .................... 475/116 |
| 5,556,356 A | * | 9/1996 | Hakamada et al. ......... 477/130 |
| 5,725,451 A | * | 3/1998 | Tsukamoto et al. ........ 475/128 |
| 6,471,613 B1 | * | 10/2002 | Botosan et al. ............. 475/127 |
| 6,754,572 B2 | * | 6/2004 | Kawamoto et al. .......... 701/51 |

* cited by examiner

*Primary Examiner*—Roger Pang
(74) *Attorney, Agent, or Firm*—Lorusso, Loud & Kelly

(57) ABSTRACT

An oil pressure control device has bypass drain oil passages that bypass a control valve and that are capable of draining the engaging pressure K from a hydraulic servo of a clutch when releasing the clutch. A drain-prohibiting check ball blocks a drain path between a manual valve and an input port.

12 Claims, 3 Drawing Sheets

FIG.2

OPERATION TABLE

| | CLUTCH | | | BRAKE | | | | OWC | | | SOLENOID | | |
|---|---|---|---|---|---|---|---|---|---|---|---|---|---|
| | C-1 | C-2 | C-3 | B-1 | B-2 | B-3 | B-4 | F-1 | F-2 | F-3 | SL1 | SL2 | SR |
| P | | | | | | | | | | | × | ○ | × |
| REV | | | ○ | (○) | | ○ | ○ | | | | × | ○ | × |
| N | | | | | | | | | | | × | ○ | × |
| 1ST | ○ | | | | | (○) | | | | ○ | × | ○ | × |
| 2ND | ○ | | | | (○) | ○ | | ○ | ○ | | × | ○ | × |
| 3RD | ○ | | ○ | (○) | | ● | | ○ | | | × | ○ | × |
| 4TH | ○ | ○ | ● | | | ● | | | | | × | ○ | × |
| 5TH | | ○ | ○ | ○ | | ● | | | | | × | × | ○ |
| N-D SHIFT | ×-○ | | | | ×-○ | | | | | ×-○ | ○-× | ○-× | ○ |

(○) INDICATES ENGINE BRAKING
● INDICATES ENGAGEMENT WITHOUT TORQUE TRANSFER
× INDICATES DISENGAGEMENT

○ ON
× OFF

OIL PRESSURE CONTROL DEVICE OF AUTOMATIC TRANSMISSION

CROSS-REFERENCE TO RELATED APPLICATIONS

This application claims, under 35 USC 119, priority of Japanese Application No. 2002-191522 filed on Jun. 28, 2002.

INCORPORATION BY REFERENCE

The disclosure of Japanese Patent Application No. 2002-191522 filed on Jun. 28, 2002, including the specification, drawings and abstract, is incorporated herein by reference in its entirety.

BACKGROUND OF THE INVENTION

1. Field of the Invention

The present invention relates to an oil pressure control device for an automatic transmission installed in a motor vehicle and, more particularly, to an oil pressure control device for an automatic transmission including a control valve that supplies engaging pressure to a friction engagement element, such as a clutch or the like, wherein the control valve is susceptible to sticking.

2. Description of the Related Art

Conventional automatic transmission oil pressure control devices (hereinafter, also referred to as "oil pressure control devices") have a plurality of shift valves, control valves, etc., that are interconnected to form a circuit, and which cooperate to change the shift speed in accordance with operation of a shift lever. Some of such oil pressure control devices are designed to supply a predetermined range pressure, such as a D (drive) range pressure or the like, to a hydraulic servo of a so-called vehicle launch clutch used at the time of starting the vehicle in motion, such as a clutch C-1, via the control valve, and to discharge the engaging pressure of the hydraulic servo via the control valve at the time of, for example, D–N control, i.e., in a shift from the D range to the N (neutral) range.

However, there is a possibility that small foreign substances in the automatic transmission fluid (ATF) (hereinafter referred to as "oil"), which is drained from the hydraulic servo by the aforementioned D–N control, will cause sticking of the control valve and, more particularly, intermediate sticking in which the spool of the control valve becomes stopped at an intermediate position. If such intermediate sticking occurs in, for example, an automatic speed change mechanism 10 as illustrated in FIG. 1, it becomes difficult to fully release the clutch C-1; furthermore, there is the danger that at the time of a N–R shift, i.e., a shift from the N range to the R range, the clutch C-3 which should engage in R range (see FIG. 2) might become tied up with the clutch C-1 in a not fully released state, thus malfunctioning and accelerating abrasion of the clutch friction plates.

In the conventional oil pressure control devices as described above, the speed of oil drainage from the hydraulic servos is dependent on oil viscosity which, in turn, varies with ambient temperature. That is, at a high temperature the oil viscosity is lower than at a low temperature. Therefore, if a D–N shift is performed at high temperature, a clutch, such as the clutch C-1 or the like, may rapidly release, causing what is generally termed a torque escape shock. At low temperature, the oil viscosity increases, and therefore the draining speed decreases, so that problems such as delayed clutch release, or the like may occur.

With the aforementioned conventional oil pressure control device, in D range a line pressure is supplied as a range pressure to the control valve via a manual valve, and in N range the control valve is connected to a drain port at the side of the manual valve. Therefore, the oil drained from the hydraulic servo during D–N control is rapidly drained from the control valve via the manual valve, creating the possibility of shock caused by rapid torque loss at a friction engagement element.

SUMMARY OF THE INVENTION

Accordingly, it is an object of the present invention to provide an oil pressure control device for an automatic transmission which is designed so that at the time of release of a friction engagement element, such as the C-1 clutch or the like, the engaging pressure can be appropriately drained from the hydraulic servo while sticking of a valve within the pressure adjusting unit, such as a control valve or the like, is avoided, whereby the above-noted problems are solved.

It is another object of the present invention to provide an oil pressure control device for an automatic transmission which is designed so as to achieve the aforementioned object, and to prevent the discomfort of shocks caused by rapid oil drainage due to a change in oil viscosity or the like, and to mitigate the problem of the drainage speed decreasing with increases in oil viscosity.

According to one aspect of the present invention, a bypass drain oil passage is provided for draining an engaging pressure while bypassing the pressure adjusting unit during release of a friction engagement element. Therefore, it is possible to achieve good drainage of the engaging pressure from the hydraulic servo even in the case of valve sticking or other undesired event within the pressure adjusting unit. The input port and the output port may be connected during drainage of the hydraulic servo, depending on the operation of the pressure adjusting unit. In such a case, the one-way valve is able to reliably prevent the drainage of the engaging pressure from the hydraulic servo toward the manual valve via the connected output port and input port.

The bypass drain oil passage may be in the form of first and second drain oil passages that form different paths between the hydraulic servo and the manual valve. Therefore, the oil pressure drainage can be appropriately changed between a relative slow drainage using one of the first and second drain oil passages, and a relatively fast drainage using both drain oil passages. The setting of a slow drainage, for example using only the first drain oil passage, will offset the effect of a decrease in the oil viscosity or the like at high temperature, and therefore will prevent shock which would otherwise be caused by a rapid torque loss at the friction engagement element. Conversely, a high drainage rate using both the first and second drain oil passages will increase the drainage speed, will tend to offset the effect of an increase oil viscosity or the like at low temperature, and therefore will allow prompt release of the friction engagement element.

The second drain oil passage may be provided with a changeover valve that can be switched between positions respectively connecting and disconnecting the second drain oil passage and the first drain oil passage. Therefore, by controlling the changeover valve, the drainage of the engaging pressure from the hydraulic servo can be appropriately and easily changed in accordance with the ambient temperature and the like.

The present invention avoids, to the extent possible, the occurrence of the valve sticking and, more particularly, intermediate sticking, which is likely to occur within the clutch control valve because of its precision structure needed for a high level of responsiveness to the control pressure.

According to the present invention, if valve sticking or the like occurs in the pressure adjusting unit at the time of engagement or disengagement of the vehicle launch clutch, it is possible to reliably prevent, for example during a shift from the first forward speed to the reverse speed, the launch clutch from functioning simultaneously with a friction engagement element, such as a clutch engaged in reverse, which would accelerate abrasion of the clutch plates.

BRIEF DESCRIPTION OF THE DRAWINGS

FIG. 2 is an operation table indicating the states of operation of friction engagement elements and the like for various shift speeds.

DETAILED DESCRIPTION OF THE PREFERRED EMBODIMENTS

Preferred embodiments of the present invention will be described hereinafter with reference to the accompanying drawings.

An automatic transmission installed in a vehicle, for example, includes an oil pressure control device 1 (FIG. 3) in accordance with the present invention, and an automatic speed change mechanism (gear mechanism) 10 (FIG. 1) that achieves, for example, five forward speeds and one reverse speed, through the control of the engagement states of a plurality of friction engagement elements (e.g., clutches C-1 to C-3, and brakes B-1 to B-4) based on oil pressure control by the oil pressure control device 1.

Figure 1:
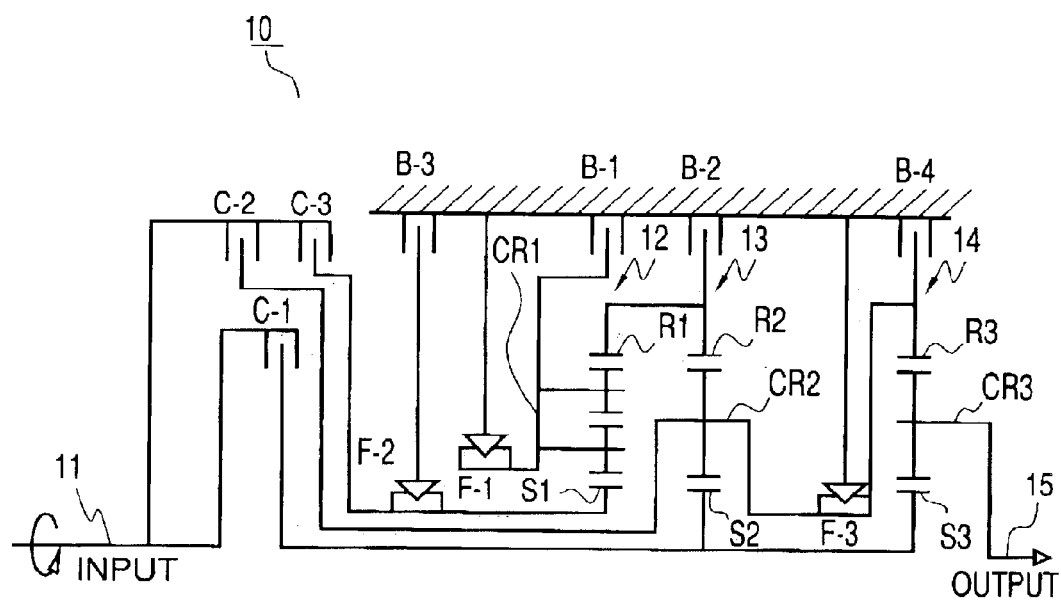
FIG. 1 is a skeletal diagram illustrating an automatic speed change mechanism to which the present invention is applicable.

As shown in FIG. 1, the automatic speed change mechanism 10 has an input shaft 11 and an output shaft 15. Arranged coaxially with the input shaft 11 and the output shaft 15 are a double-pinion planetary gear unit 12 having a sun gear S1, a carrier CR1 and a ring gear R1, and a simple planetary gear unit 13 having a sun gear S2, a carrier CR2 and a ring gear R2, as well as a simple planetary gear unit 14 having a sun gear S3, a carrier CR3 and a ring gear R3. Disposed at the input side of the automatic speed change mechanism 10 are a radially inward-side clutch C-1, and a clutch C-2 and a clutch C-3 in what is generally termed a "double-clutch arrangement" in which two clutches are juxtaposed.

The clutch C-3 is connected to the sun gear S1. The sun gear S1 is restricted to rotation in one direction by operation of a one-way clutch F-1 that is engaged via engagement of a brake B-3. The carrier CR1 meshing with the sun gear S1 can be restricted to one rotational direction by the, one-way clutch F-1, and can be freely fixed by the brake B-1. The ring gear R1 meshing with the carrier CR1 is connected to the ring gear R2. The ring gear R1 and the ring gear R2 are freely braked by a brake B-2.

The clutch C-2 is connected to the carrier CR2 that meshes with the ring gear R2 and is connected to the ring gear R3. The carrier CR2 and the ring gear R3 can be restricted to rotation in one direction by a one-way clutch F-3, and are freely braked by a brake B-4. The clutch C-1 is also connected to the sun gear S2 and the sun gear S3. The sun gear S2 meshes with the carrier CR2, and the sun gear S3 meshes with the carrier CR3. The carrier CR3 meshes with the ring gear R3, and is connected to the output shaft 15.

Operation of the automatic speed change mechanism 10 will next be described with reference to FIGS. 1 and 2. FIG. 2 is an operation table indicating the states of operation of elements of the automatic speed change mechanism 10 in the various ranges. As indicated in FIG. 2, for the first forward speed (1ST), the clutch C-1 is engaged and the one-way clutch F-3 is actuated while linear solenoid valve SL1 is off, linear solenoid valve SL2 is on and solenoid valve SR is off, as described in detail below with reference to FIG. 3. Then, as indicated in FIG. 1, the rotation of the input shaft 11 is input to the sun gear S3 via the clutch C-1, and rotation of the ring gear R3 is limited to one direction by the one-way clutch F-3. Due to rotation of the sun gear S3 at the input speed and the ring gear R3 being limited to rotation in one direction, the carrier CR3 rotates at a reduced speed. Therefore, the output shaft 15 outputs forward rotation as the first forward speed. That is, the automatic speed change mechanism 10 achieves the first forward speed.

During engine braking (coasting) in the first forward speed, the brake B-4 is operated instead of the one-way clutch F-3 as indicated in FIG. 2, so that rotation of the ring gear R3 is fixed against idle rotation, thus achieving the first forward speed as in the above-described case.

For the second forward speed (2ND), the clutch C-1 is engaged and the brake B-3 is operated and the one-way clutch F-1 and the one-way clutch F-2 are actuated while the linear solenoid valve SL1 is off, the linear solenoid valve SL2 is on and the solenoid valve SR is off, as indicated in FIG. 2. Then, as indicated in FIG. 1, the one-way clutch F-2, engaged via the brake B-3, limits rotation of the sun gear S1 to one direction, and the one-way clutch F-1 limits rotation of the carrier CR1 to one direction, thus limiting rotation of the ring gear R1 and the ring gear R2 to one direction as well. When the rotation of the input shaft 11 is input to the sun gear S2 via the clutch C-1, the carrier CR2 and the ring gear R3 rotate at a reduced speed due to rotation of the sun gear S2 at the input speed and the ring gear R2 being limited to rotation in one direction. In addition, as the rotation of the input shaft 11 is input to the sun gear S3 via the clutch C-1, the carrier CR3 rotates at a reduced speed which is slightly faster than the first forward speed, due to rotation of the sun gear S3 at the input speed and the ring gear R3 rotating at the reduced speed. Therefore, the output shaft 15 outputs forward rotation as the second forward speed. That is, the automatic speed change mechanism 10 achieves the second forward speed.

During engine braking (coasting) in the second forward speed, the brake B-2 is operated instead of the one-way clutch F-1 and the one-way clutch F-2, as indicated in FIG. 2, so that the ring gears R1 and R2 are fixed to prevent idle rotation, thus achieving the second forward speed as in the above-described case.

For the third forward speed (3RD), the clutch C-1 is engaged and the clutch C-3 is engaged and the one-way clutch F-1 is actuated while the linear solenoid valve SL1 is off, the linear solenoid valve SL2 is on and the solenoid valve SR is off, as indicated in FIG. 2. Then, as indicated in FIG. 1, the engagement of the clutch C-3 causes the input rotation to be input to the sun gear S1, and the one-way clutch F-1 limits rotation of the carrier CR1 to one direction.

Due to rotation of the sun gear S1 at the input speed and the carrier CR1 being limited to rotation in one direction, the ring gears R1 and R2 rotate at a reduced speed. As the rotation of the input shaft 11 is input to the sun gear S2 via the clutch C-1, the carrier CR2 and the ring gear R3 rotate at a relatively faster reduced speed due to the rotation of the sun gear S2 at the input speed and rotation of the ring gear R2 at a reduced speed. In addition, as the rotation of the input shaft 11 is input to the sun gear S3 via the clutch C-1, the carrier CR3 rotates at a reduced speed which is slightly faster than the second forward speed due to rotation of the sun gear S3 at the input speed and rotation of the ring gear R3 at a reduced speed. Therefore, the output shaft 15 outputs forward rotation as the third forward speed. That is, the automatic speed change mechanism 10 achieves the third forward speed.

During engine braking (coasting) in the third forward speed, the brake B-1 is operated instead of the one-way clutch F-1 as indicated in FIG. 2, so that the carrier CR1 is fixed so as to prevent idle rotation, thus achieving the third forward speed as in the above-described case.

For the fourth forward speed (4TH), the clutch C-1 is engaged and the clutch C-2 is engaged while the linear solenoid valve SL1 is off, the linear solenoid valve SL2 is on and the solenoid valve SR is off, as indicated in FIG. 2. Then, as indicated in FIG. 1, the engagement of the clutch C-2 causes the input rotation to be input to the carrier CR2 and the ring gear R3. Furthermore, the rotation of the input shaft 11 is input to the sun gear S3 via the clutch C-1. Due to rotation of the sun gear S3 and the ring gear R3 at the input speed, direct-coupled rotation is achieved, that is, the carrier CR3 rotates at the input speed. Therefore, the output shaft 15 outputs forward rotation as the fourth forward speed. That is, the automatic speed change mechanism 10 achieves the fourth forward speed.

For the fifth forward speed (5TH), the clutch C-2 is engaged, the clutch C-3 is engaged and the brake B-1 is operated while the linear solenoid valve SL1 is on, the linear solenoid valve SL2 is off and the solenoid valve SR is on, as indicated in FIG. 2. Then, as indicated in FIG. 1, the engagement of the clutch C-3 causes the input rotation to be input to the sun gear S1, and the brake B-1 fixes the carrier CR1. Due to rotation of the sun gear S1 at the input speed and the carrier CR1 being fixed, the ring gears R1 and R2 rotate at a reduced speed. The input rotation is input to the carrier CR2 and the ring gear R3 by engagement of the clutch C-2. Due to rotation of the carrier CR2 at the input speed and rotation of the ring gear R2 at a reduced speed, the sun gears S2 and S3 rotate at an increased speed. Furthermore, due to rotation of the sun gear S3 at an increased speed and rotation of the ring gear R3 at the input speed, the carrier CR3 rotates at an increased speed. Therefore, the output shaft 15 outputs forward rotation as the fifth forward speed. That is, the automatic speed change mechanism 10 achieves the fifth forward speed.

For reverse (REV), the clutch C-3 is engaged, the brake B-4 is operated and the one-way clutch F-1 is actuated while the linear solenoid valve SL1 is off, the linear solenoid valve SL2 is on and the solenoid valve SR is off, as indicated in FIG. 2. Then, as indicated in FIG. 1, the engagement of the clutch C-3 causes the input rotation to be input to the sun gear S1, and the one-way clutch F-1 limits rotation of the carrier CR1 to one direction. Due to rotation of the sun gear S1 at the input speed and the carrier CR1 being restricted to rotation in one direction, the ring gears R1 and R2 rotate at a reduced speed. Due to engagement of the brake B-4, the carrier CR2 and the ring gear R3 are fixed against rotation.

Therefore, due to rotation of the ring gear R2 at a reduced speed and the carrier CR2 being fixed, the sun gears S2 and S3 rotate in reverse. Due to rotation of the sun gear S3 in reverse and the ring gear R3 being fixed, the carrier CR3 rotates in reverse. Thus, the output shaft 15 outputs reverse rotation. That is, the automatic speed change mechanism 10 establishes the first reverse range.

During engine braking (coasting) in the first reverse speed, the brake B-1 is operated instead of the one-way clutch F-1 as indicated in FIG. 2, so that the carrier CR1 is fixed so as to prevent idle rotation, thus achieving the reverse range as in the above-described case.

In N range, all of the clutches, the brakes and the one-way clutches are disengaged (or not-operated) while the linear solenoid valve SL1 is off, the linear solenoid valve SL2 is on and the solenoid valve SR is off, as indicated in FIG. 2. Therefore, the rotation of the input shaft 11 is not transferred to the output shaft 15 (see FIG. 1).

For the N–D shift, the linear solenoid valves SL1, SL2 change their output control pressures PSL1, PSL2 from a low pressure to a high pressure, and the solenoid valve SR is on, as indicated in FIG. 2. Conversely, for a shift from the D range to the N range, the linear solenoid valve SL1 is changed from the off-state to the on-state, and the solenoid valve SR is turned off at a predetermined time, as is apparent from FIG. 2. Therefore, the brake B-2 and the clutch C-1 are released, and the one-way clutch F-3 is switched from the actuated state to the non-actuated state. Thus, a neutral state is established in which the rotation of the input shaft 11 is not transferred to the output shaft 15 (see FIG. 1).

Figure 3:
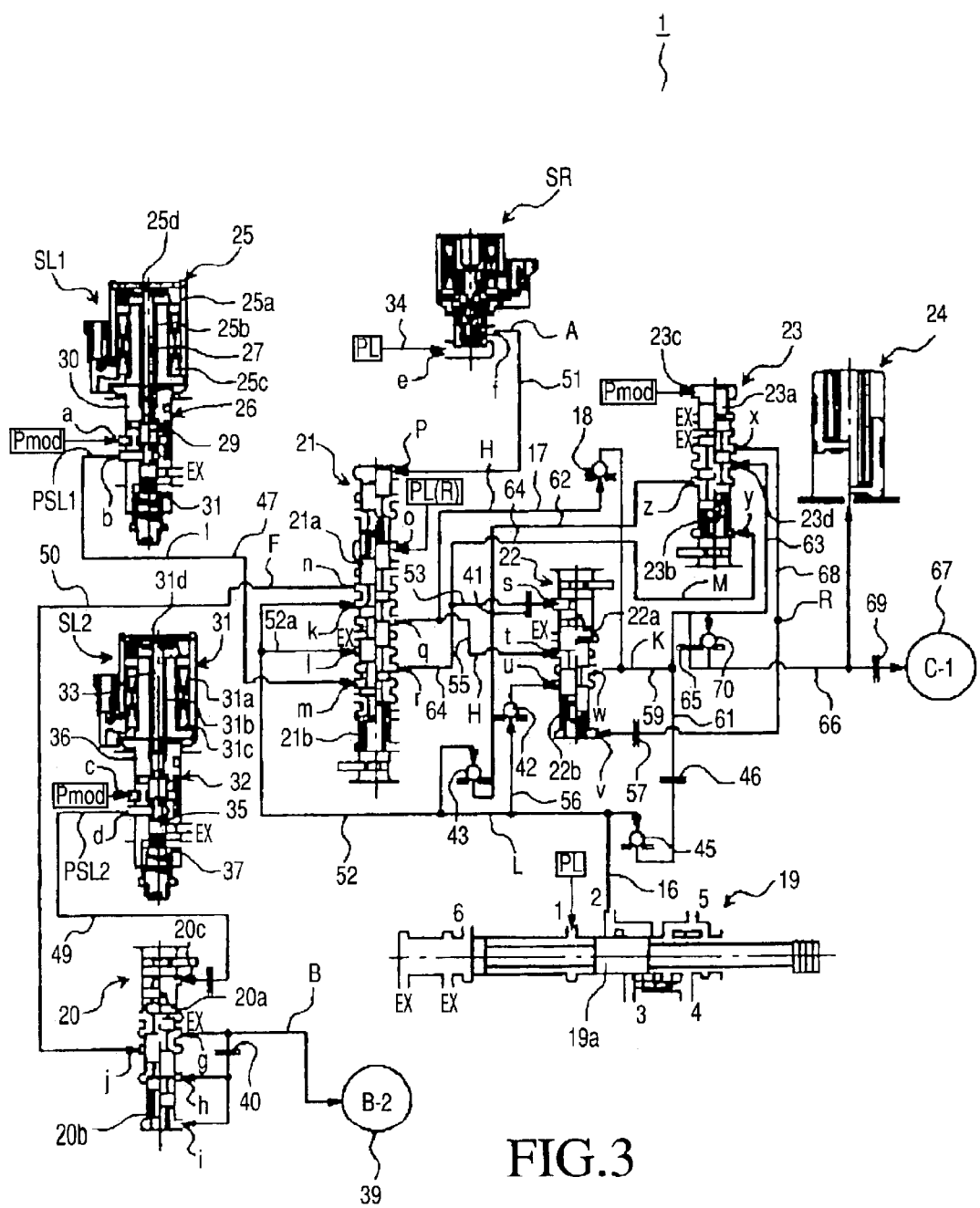
FIG. 3 is a schematic view of a circuit of an oil pressure control device of an automatic transmission in accordance with the present invention.

Next the oil pressure control device 1 will be described with reference to FIG. 3 which schematically illustrates portions relevant to the present invention. In actuality the oil pressure control device 1 has many more valves, oil passages, etc., and hydraulically controls, for example, a lubricant circuit, a lockup clutch, and hydraulic servos for controlling the engagement states of the friction engagement elements of the automatic speed change mechanism 10 described above. In FIG. 3, "EX" indicates a drain port.

As shown in FIG. 3, the oil pressure control device 1 has a manual valve 19, linear solenoid valves SL1, SL2 of a normally open type, solenoid valve SR of a normally closed type, brake control valve 20, clutch apply control valve 21, clutch control valve 22, clutch lock valve 23, and C-1 accumulator 24.

The manual valve 19 operates in accordance with operation of a shift lever performed by a driver so as to switch a line pressure PL (oil pressure supplied to a port 1) between a port 2 and a port 5 in accordance with the position of a spool 19a.

The linear solenoid valve SL1 has a solenoid portion 25 and a pressure-adjusting valve portion 26, and is able to change a solenoid pressure when necessary in response to a control signal from a control unit (not shown). In the solenoid portion 25, a coil 25c is sandwiched between a yoke 25a and a stator core 25b. A shaft 27 extends slidably through a central hole 25d of the stator core 25b, and contacts a spool 29 of the pressure-adjusting valve portion 26. The pressure-adjusting valve portion 26 includes a valve body 30, and the spool 29 that is slidably fitted in the body 30. The spool 29 is urged upward in FIG. 3 by a compressed spring 31. The valve body 30 has a port a that receives a modulator pressure Pmod as an oil pressure by a modulator valve (not shown), and a port b for supplying the low pressure or high pressure control pressure PSL1. The port b is connected to a port m of the clutch apply control valve 21 via an oil passage 47.

The linear solenoid valve SL2 has a solenoid portion 31 and a pressure-adjusting valve portion 32, and is able to change a solenoid pressure as necessary in response to a control signal from the control unit. In the solenoid portion 31, a coil 31c is sandwiched between a yoke 31a and a stator core 31b. A shaft 33 extends slidably through a central hole 31d of the stator core 31b, and contacts a spool 35 of the pressure-adjusting valve portion 32. The pressure-adjusting valve portion 32 includes a valve body 36, and the spool 35 that is slidably fitted in the body 36. The spool 35 is urged upward in FIG. 3 by a compressed spring 37. The valve body 36 has a port c that receives the aforementioned modulator pressure Pmod, and a port d for supplying the control pressure PSL2. The port d is connected to a control oil chamber 20c of the brake control valve 20 via an oil passage 49.

The solenoid valve SR switches on/off in response to a control signal from the control unit, so as to supply an oil passage 51 with a line pressure PL (as a "control pressure A") obtained by adjustment of an oil pressure from an oil pump (oil pressure source, which is not shown in the drawings) by a primary regulator valve (not shown) or the like, or to shut off the supply of the control pressure A. The solenoid valve SR has a port e that receives the line pressure PL via an oil passage 34, and a port f for outputting a signal pressure A based on the line pressure PL in accordance with the on/off state of the solenoid valve SR.

As used herein, the terminology "line pressure" refers to a pressure obtained by adjusting the oil pressure from an oil pump (not shown) by a primary regulator valve (not shown), and the terminology "range pressure" refers to a pressure that is generated for each range by inputting the line pressure to a manual valve 19 that is switched by an operation of a shift member (not shown), such as a shift lever, a switch, etc.

The brake control valve 20 has a spool 20a movable upward and downward in FIG. 3, a spring 20b that urges the spool 20a upward, a control oil chamber 20c to which the control pressure PSL2 is supplied from the linear solenoid valve SL2 via the oil passage 49, a port g for supplying a hydraulic servo 39 for the brake B-2 with an engaging pressure B, oil chambers h, i to which the engaging pressure B output from the port g is fed back via an orifice 40, and a port j to which a supply pressure F output from the clutch apply control valve 21 is supplied via an oil passage 50.

The clutch apply control valve 21 has a spool 21a movable upward and downward in FIG. 3, a spring 21b that urges the spool 21a upward, ports k, l that, when the manual valve 19 is set in a forward running range (e.g., the D range), receives the D range pressure (L) via an oil passage 52 and the manual valve 19 or the like, a port m to which the control pressure PSL1 is supplied from the port b of the linear solenoid valve SL1 via the oil passage 47, a port n for outputting the supply pressure F when set at a position indicated by the left-half illustration in FIG. 3, a port o to which the R (reverse) range pressure based on the line pressure PL is supplied, a port p to which the signal pressure A from the solenoid valve SR is supplied by the oil passage 51, a port q for outputting a supply pressure H based on the D range pressure (L) via an oil passage 55, and a port r for outputting via an oil passage 64 the control pressure I received from the solenoid SL1.

An oil passage 17 is connected to the oil passage 55 and to an oil passage 59 via a check ball 18. The check ball 18 allows action of oil pressure from the side of the clutch apply control valve 21 to the side of a hydraulic servo 67, and blocks action of oil pressure in the opposite direction. In this embodiment, the check ball is employed as a one-way valve, but may be replaced by another type of check valve.

The clutch control valve 22 has a spool 22a movable upward and downward in FIG. 3, a spring 22b that urges the spool 22a upward, a control oil chamber s to which the control pressure I from the port r of the clutch apply control valve 21 is supplied via an oil passage 53 and an orifice 41, and a port t that receives the supply pressure H from the port q of the clutch apply control valve 21 via the oil passage 55 and that also functions as a drain port. The control valve 22 further has an input port u to which the D range pressure (L) from the manual valve 19 is supplied via an oil passage 56 and a drain-prohibiting check ball 42, a port v to which a feedback pressure R from a port x of the clutch lock valve 23 is supplied via an oil passage 68 and an orifice 57, and an output port w for outputting an engaging pressure K, based on the supply pressure H, into the oil passage 59. The engaging pressure K is supplied to the port 23d of the clutch lock valve 23 via the oil passages 59, 63, and is also supplied to the hydraulic servo 67 via the oil passage 59, an orifice 65, an oil passage 66, and an orifice 69.

Although in this embodiment, the clutch control valve 22 serves as the "pressure adjusting unit" in the above-described embodiment, the pressure adjusting unit is not so limited, and may be formed by, for example, a single linear solenoid valve that performs both the function of the linear solenoid valve SL1 and the function of the clutch control valve 22.

The drain-prohibiting check ball 42 is disposed in the oil passage (path) 56 between the manual valve 19 and the input port u, and serves as a one-way valve that allows only the supply of oil pressure to the input port u. That is, the check ball 42 allows the D range pressure (L) from the manual valve 19 to be supplied to the input port u of the clutch control valve 22, and while blocking the reverse flow of oil pressure to the manual valve 19 from the input port u when the control valve 22 is in the position (supply position) indicated by the right-half illustration. In other words, the check ball 42 blocks escape of the engaging pressure K from the clutch control valve 22 while the control valve 22 is in the right-half illustrated position where the engaging pressure K is supplied to the hydraulic servo 67.

A check ball 70 is disposed in parallel with the orifice 65 so as to block flow of oil pressure from the clutch control valve 22 to the hydraulic servo 67, while allowing flow of oil pressure in the opposite direction. The engaging pressure K is supplied to the oil passage 66 via the orifice 65 during engagement of the clutch C-1, and is drained toward the oil passages 61, 63 via the check ball 70 as well as through the orifice 65 during disengagement of the clutch C-1.

The control valve 22 outputs the D range pressure (L) supplied to the input port u, as the engaging pressure K adjusted in accordance with the control pressure I supplied to the control oil chamber s, and to output to the hydraulic servo 67 the supply pressure H from the clutch apply control valve 21 as the engaging pressure K. The control valve 22, when at the position indicated by the right-half illustration, supplies the D range pressure (L), received through the drain-prohibiting check ball 42, to the hydraulic servo 67 so as to completely engage the clutch C-1.

The clutch lock valve 23 has a spool 23a movable upward and downward in FIG. 3, a spring 23b that urges the spool 23a upward, a port x for supplying the feedback pressure R to the port v of the clutch control valve 22 via the oil passage 68 and an orifice 57, a port y to which the control pressure I, i.e., a switching pressure M, is supplied via the oil passage 64, a port z for draining the engaging pressure K via an oil passage 62 and a check ball 43, the port 23c to which the modulator pressure Pmod is supplied, and the port 23d to which the engaging pressure K is supplied. The check ball 43 allows flow of oil pressure from the clutch lock valve 23 and blocks action of oil pressure in the opposite direction.

The clutch lock valve 23 is disposed between second drain oil passages 62, 63 described below, and serves as a changeover valve that changes between positions respectively allowing and blocking communication of the second drain oil passages 62, 63 with a first drain passage 61. During pressure adjusting control (generally referred to as "direct control"), the clutch lock valve 23 supplies the feedback pressure R to the clutch control valve 22. Upon completion of engagement of the clutch C-1, the clutch lock valve 23 assumes a position where the valve 23 stops the supply of the feedback pressure R and supplies the D range pressure (L), received via the drain-prohibiting check ball 42, to the clutch C-1 as the engaging pressure K.

Furthermore, at the time of release of the clutch C-2 from an engaged state, the clutch lock valve 23 at an appropriate time is switched to the position indicated by the right-half illustration or to the position indicated by the left-half illustration, on the basis of a high or low control pressure I supplied to the port y, while the escape of the engaging pressure K via the clutch control valve 22 is blocked by the drain-prohibiting check ball 42. As a result, if the clutch lock valve 23 is at the position indicated by the left-half illustration, the clutch lock valve 23 blocks the passage from the port 23d to the port z, and establishes a slow draining state wherein the engaging pressure K supplied to the hydraulic servo 67 is drained via the oil passages 66, 61 and a check ball 45. If the clutch lock valve 23 is in the position indicated by the right-half illustration, the clutch lock valve 23 connects the port 23d and the port z, and establishes a rapid draining state wherein the engaging pressure K supplied to the hydraulic servo 67 is drained via the oil passages 66, 63, 62 and the check ball 43. The check ball 45 is disposed in series with an orifice 46, for the purpose of providing a drain in the event of valve sticking and for the purpose of providing a slow drainage path.

That is, during release of the clutch C-1, the clutch lock valve 23 is selectively switched between the left-half illustrated position where the oil passage 62 and the oil passage 63 are blocked, and the right-half illustrated position where the oil passage 62 and the oil passage 63 are in communication, by appropriately timed supply of a changeover pressure M, which is two-stage oil pressures above the oil pressure that is needed to hold the clutch control valve 22 in the right-half illustrated position, when the clutch control valve 22 has been switched to the right-half illustrated position by the control pressure I. That is, the aforementioned changeover is released by setting the oil pressure tending to raise the spool 22a, based on the pressure-receiving area of the spool 22a of the clutch control valve 22, the elastic force of the spring 22b, etc., at a level above that oil pressure tending to lower the spool 23a, based on the pressure-receiving area of the spool 23a of the clutch lock valve 23, the elastic force of the spring 23b, etc.

The oil passage 61 serves as a "first drain oil passage", and the oil passage 62 and the oil passage 63 together serve as a "second drain oil passage". The first and second drain passages which provide different paths between the hydraulic servo 67 and the manual valve 19 form a "bypass drain oil passage".

The C-1 accumulator 24 is connected to a portion of the oil passage 66 that extends between the check ball 70 and the orifice 69, and reduces the shock of torque loss that is otherwise likely to occur upon drainage of the engaging pressure K from the hydraulic servo 67 during the D–N shift.

Next, operation of the oil pressure control device 1 will be described. For example, when the oil pump (oil pressure source) is driven by the engine (not shown), for example, the line pressure PL is generated, and is supplied to the port e of the solenoid valve SR, the port 1 of the manual valve 19, etc. In this state, the N–D shift control is initiated, responsive to the shift lever being shifted to the D range, in order to start the vehicle in motion from a stopped state. The spool 19a of the manual valve 19 is thereby positioned to output the D range pressure (L) from the port 2 to the ports k, 1 of the clutch apply control valve 21, and the input port u of the clutch control valve 22. In this case, both the linear solenoid valves SL1, SL2 change from the on-state told the off-state, and the solenoid valve SR assumes the on-state.

Therefore, the linear solenoid valve SL1 supplies the control pressure PSL1 set to the high-pressure side on the basis of the modulator pressure Pmod supplied to the port a. In this case, the clutch apply control valve 21 is positioned at the left-half illustrated position due to supply the changeover pressure A output from the solenoid valve SR to the control oil chamber p. Therefore, the control pressure PSL1 supplied to the port m is output from the port r as the control pressure I, and is supplied to the control oil chamber s of the clutch-control valve 22 and the port y of the clutch lock valve 23. Furthermore, the D range pressure (L) received at the port k is supplied from the port n to the port j of the brake control valve 20 as a supply pressure F.

Thus, the clutch control valve 22 adjusts the D range pressure (L) supplied to the port u, and outputs it as the engaging pressure K from the output port w in accordance with the slight movement of the spool 22a in response to the control pressure I supplied to the control oil chamber s. At this time, the clutch lock valve 23 has been changed to the left-half illustrated position due to the dominance of the modulator pressure Pmod input to the control oil chamber 23c over the control pressure I (M) supplied to the port y which is lower than a predetermined pressure. Therefore, the engaging pressure K from the output port w of the control valve 22 is received at port 23d and is returned as the feedback pressure R from the port x of the clutch lock valve 23 to the port v. Therefore, the clutch control valve 22 outputs an appropriately adjusted engaging pressure K from the output port w, with the feedback of the output engaging pressure K to the port v. The hydraulic servo 67 receives the gradually-rising engaging pressure K via the orifice 65, the oil passage 66 and the orifice 69, and therefore gradually engages the clutch C-1.

The linear solenoid valve SL2 outputs from the port d the control pressure PSL2 adjusted on the basis of the modulator pressure Pmod supplied to the port c, and supplies it to the control oil chamber 20c of the brake control valve 20, thereby changing the valve 20 to the right-half illustrated position. In this case, since the clutch apply control valve 21 is at the left-half illustrated position as mentioned above, the D range pressure (L) from the manual valve 19 is introduced at the port n via the port k, so that the supply pressure F is output and supplied to the port j of the brake control valve 20 from which the engaging pressure B is generated and used to engage the brake B-2. The brake B-2 is thereafter released when the clutch apply control valve 21 is changed to the right-half illustrated position.

The control unit (not shown) turns off the solenoid valve SR at a predetermined timing. Therefore, due to the discontinuation of the changeover pressure A, the clutch apply control valve 21 is changed to the right-half illustrated position. Then, the D range pressure (L) supplied from the manual valve 19 to the port k of the control valve 21 via the oil passage 52 is output from the port q of the valve 21 to the port t of the control valve 22. Furthermore, the D range pressure (L) supplied from the manual valve 19 to the port 1 of the clutch apply control valve 21 via the oil passage 52 is supplied from the port r of the valve 21 to the control oil chamber s of the control valve 22 and to the port y of the clutch lock valve 23.

In the clutch lock valve 23, the combination of the force of the D range pressure (L) supplied as the changeover pressure M to the port y and the elastic force of the spring 23b overcome the modulator pressure Pmod input to the port 23c, so that the spool 23a is raised to the right-half illustrated position. Hence, the feedback pressure R supplied from the port x to the port v of the control valve 22 is blocked. In this case, in the clutch control valve 22, the D range pressure (L) supplied as the control pressure I to the control oil chamber s overcomes the elastic force of the spring 22b, and lowers the spool 22a. Thus, the control valve 22 is changed to the right-half illustrated position. Since the input port u is fully in communication to the output port w, the D range pressure (L) from the manual valve 19 is directly supplied to the input port u via the drain-prohibiting check ball 42, and is output from the output port w as the engaging pressure K. Therefore, the engaging pressure K is supplied to the hydraulic servo 67 via the orifice 65, the oil passage 66, and the orifice 69, so that the clutch C-1 receives D range pressure (L), and thereby becomes completely engaged.

Due to the clutch C-1 engaged as described above and the one-way clutch F-3 being actuated, the automatic speed change mechanism 10 is shifted to the first forward speed, so that the vehicle will be promptly put in motion ("launched").

In the case of a shift to reverse following a stop of the vehicle, after a shift from the aforementioned first forward speed to another forward speed, the movement of the shift lever to the R position via the N position achieves a shift to reverse after the temporary shift to neutral. Because a shift operation involving the R range is not part of the present invention, description of the clutch C-3, the brake B-1 (applied in engine braking), the brake B-4 and the one-way clutch F-3 is omitted, and the operation thereof will be only briefly described below.

When the shift lever is moved to the N range position, the spool 19a of the manual valve 19 is moved so as to establish a state where, in FIG. 3, only the modulator pressure Pmod to the ports a, c of the linear solenoid valves SL1, SL2, the oil pressure (line pressure PL) from the oil pressure source to the solenoid valve SR, and the modulator pressure Pmod to the port 23c of the clutch lock valve 23 are supplied. The linear solenoid valves SL1, SL2 are changed by Pmod from OFF to ON, and the solenoid valve SR is changed by the line pressure PL to its ON state. In conjunction with the foregoing operations, the brake B-2 and the clutch C-1 are released, and the one-way clutch F-3 changes from the actuated state to the non-actuated state, thus achieving a neutral state wherein the rotation of the input shaft 11 is not transferred to the output shaft 15 (see FIG. 1).

As shown in FIG. 3, responsive to the modulator pressure Pmod the linear solenoid valve SL1 (in the on-state) supplies the control pressure PSL1 to the port m of the clutch apply control valve 21. With the control valve 21 in the left-half illustrated position, due to the supply of the changeover pressure A to the port p from the solenoid valve SR, the control pressure PSL1 supplied to the port m is output as the control pressure I from the port r, and is supplied to the control oil chamber s of the clutch control valve 22 and to the port y of the clutch lock valve 23. The control pressure I is selectively supplied as either a relatively low first oil pressure or a relatively high second oil pressure that is a stepwise pressure control which changes the lock valve 23 between the left-half illustrated position where the drain oil passages 62, 63 are disconnected, and the right-half illustrate position where the oil passages 62, 63 are connected. Thus, through appropriate regulation of the control pressure PSL1 by the linear solenoid valve SL1, based on signals from the control unit (not shown), the control pressure I can be either at a level which allows the spool 23a of the clutch lock valve 23 to be lowered by the modulator pressure Pmod while keeping the clutch control valve 22 at the right-half illustrated position, or at a level of oil pressure that raises the spool 23a of the lock valve 23, overcoming the modulator pressure Pmod, while keeping the control valve 22 at the right-half illustrated position.

The above-described stepwise changing of the control pressure I makes it possible to appropriately achieve either slow drainage where communication between the port z and the port 23d and therefore between the second drain oil passages 62, 63 is blocked, or fast drainage where the port z and the port 23d are in communication so as to connect the second drain oil passages 62, 63, only by changing the clutch lock valve 23 between the left-half illustrated position and the right-half illustrated position, while the clutch control valve 22 is held in its right-half illustrated position and the check ball 42 prevents drainage of the engaging pressure K into the oil passage 56 through the control valve 22. Thus, the drainage of the engaging pressure K from the hydraulic servo 67 can be appropriately and easily changed in accordance with the ambient temperature and the like, by controlling operation of the lock valve 23.

In this embodiment, the pressure control device is initially set for clutch disengagement with the slow drainage by controlling the control pressure I to the first oil pressure and with fast drainage only when necessary. Therefore, responsive to supply of the control pressure I, the engaging pressure K supplied to the hydraulic servo 67 is relatively gently drained via the orifice 69, the oil passage 66, the orifice 65 and the check ball 70, and via the first drain oil passage 61 and the orifice 46. If changed to the fast drainage state, the engaging pressure K is rapidly drained through orifice 69, the oil passage 66, the orifice 65 and the check ball 70. During fast drainage, the control valve 22 is held in its right-half illustrated position by the raised control pressure I, and therefore the output port w and the input port u are connected. However, due to the presence of the check ball 42 in the oil passage 56 connected to the output side of the input port u, the escape of the engaging pressure K via the control valve 22 is avoided.

Upon shifting to the N range, the action of the D range pressure (L) (from the manual valve 19 via the oil passage 56) on the clutch control valve 22 is discontinued due to switching of the manual valve 19. Without provision of the drain-prohibiting check ball 42, the engaging pressure K would be rapidly drained toward the manual valve 19 via the output port w and the input port u connected thereto in the fast drainage state, thus causing shock. Thus, the presence of the drain-prohibiting check ball 42 achieves the advantage of avoiding valve sticking to the extent possible, and also achieves the advantage of preventing rapid draining of the engaging pressure K toward the manual valve 19. During the aforementioned draining bypassing the clutch control valve 22, that is, slow drainage state, the engaging pressure K is relatively gently drained toward the manual valve 19 via the orifice 46, thereby preventing the aforementioned shock.

The change between the fast drainage state and the slow drainage may also be executed by appropriate change between the first oil pressure and the second oil pressure performed by, for example, control of the linear solenoid valve SL1 responsive to an oil temperature detection signal from an oil temperature sensor that measures the oil (ATF) temperature.

Furthermore, if the change between the fast drainage and the slow drainage passage is by the stepwise changing of the control pressure I, the following advantages can be achieved. That is, the draining speed can be optimized in accordance with the ambient temperature by utilizing the slow drainage state at high oil temperature where the oil viscosity is low, and utilizing the fast drainage state for a low oil temperature where the oil viscosity is high. Therefore, since the draining speed is reduced for a high oil temperature, shock which would otherwise be caused by rapid torque loss can be prevented. Furthermore, if with low temperature oil, the draining speed is increased so as to rapidly release the clutch C-1, it becomes possible to reliably prevent, for example, an undesirable event wherein, although a shift from the D range to the R range has been performed, the release of the clutch C-1 engaged in the D range is incomplete, and the clutch C-1 becomes tied up with the clutch C-3, which is engaged in the R range.

After the N range is achieved by completely releasing the clutch C-1, the automatic speed change mechanism 10 performs N–R shift control. In the N–R shift control, the linear solenoid valves SL1, SL2 are set to the off-state and the solenoid valve SR is set to the on-state, and other linear solenoid valves and solenoid valves (not shown) are on-off controlled in appropriate fashion. Therefore, a hydraulic servo (not shown) of the clutch C-3 is supplied with an engaging pressure via a changeover valve (not shown) or the like, and therefore engages the clutch C-3. Likewise, hydraulic servos (not shown) of the brakes B-1, B-4 are supplied with engaging pressures via changeover valves (not shown) or the like, and therefore engage the brake B-1 (in engine braking) and the brake B-4. The thus-engaged clutch C-3 and brakes B-1, B-4 as well as the one-way clutch F-1, actuated in relation to the operations of the clutch C-3 and the brakes B-1, B-4, establish the reverse range.

With the oil pressure control device 1 of the foregoing embodiment, during disengagement of the clutch C-1, it is possible to achieve good drainage of the engaging pressure K from the hydraulic servo 67 while avoiding valve sticking, more particularly, intermediate sticking or the like, which might otherwise occur in the clutch control valve 22, by connecting the hydraulic servo 67 and the manual valve 19 via the bypass drain passage (61, 62, 63), bypassing the control valve 22.

In the foregoing embodiment, the present invention is applied to the clutch C-2 that serves as a launching clutch. Therefore, it is possible to avoid sticking of the clutch control valve 22 to the extent possible during the clutch engagement and disengagement frequently performed at the time of starting the vehicle in motion ("launching"), and to reliably avoid an event, for example, the clutch C-1 and the clutch C-3 simultaneously engaging at the time of a shift from the first forward speed to reverse (become tied up), and thereby accelerating abrasion of the clutch plates.

Furthermore, since the common control pressure I based on the control signal is changed stepwise, and is supplied to the clutch lock valve 23, it is possible to freely change the clutch lock valve 23 between its right-half illustrated position and its left-half illustrated position while holding the clutch control valve 22 in its right-half illustrated position. Therefore, it is possible to change the state of drainage merely by selectively switching the lock valve, having a conventional structure, without a need to separately provide circuits for individually changing the positions of the spools of the control valve 22 and the lock valve 23. Therefore, the circuit of the oil pressure control device 1 is simplified, and the cost cut by using conventional components.

Furthermore, while in the foregoing embodiment the control device is initially set for the slow drainage state in normal operation with the capability to change, if necessary, to the fast drainage state by changing the control pressure I to the second oil pressure. However, the sequence may be reversed.

Although drainage control of the hydraulic servo 67 of the clutch C-1 has been described in conjunction with the foregoing embodiment, the present invention is not so limited. The present invention is applicable to drainage control of any friction engagement element, including other clutches, brakes engaged for engine braking, etc., so long as there is a possibility that a control valve corresponding to the friction engagement element may stick during draining.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An oil pressure control device for an automatic transmission, comprising:
   a manual valve that changes ranges;
   a hydraulic servo that engages and disengages a friction engagement element in accordance with an engaging pressure;
   a pressure adjusting unit having an input port, an output port and a drain port for adjusting a range pressure received from the manual valve at the input port and outputting an adjusted pressure as the engaging pressure from the output port;
   a bypass drain oil passage for draining the engaging pressure from the hydraulic servo while bypassing the pressure adjusting unit; and
   a one-way valve disposed in a path between the manual valve and the input port for allowing flow of oil pressure only toward the input port.

2. The oil pressure control device according to claim 1, wherein the bypass drain oil passage includes a first drain oil passage and a second drain oil passage that respectively provide different paths between the hydraulic servo and the manual valve.

3. The oil pressure control device according to claim 2, wherein at least the second drain oil passage is provided with a changeover valve for connecting and disconnecting the second drain oil passage and the first drain oil passage.

4. The oil pressure control device according to claim 1, wherein the pressure adjusting unit includes a clutch control valve that outputs the engaging pressure by adjusting the range pressure based on a control pressure from a linear solenoid valve.

5. The oil pressure control device according to claim 2, wherein the pressure adjusting unit includes a clutch control valve that outputs the engaging pressure by adjusting the range pressure based on a control pressure from a linear solenoid valve.

6. The oil pressure control device according to claim 3, wherein the pressure adjusting unit includes a clutch control valve that outputs the engaging pressure by adjusting the range pressure based on a control pressure from a linear solenoid valve.

7. The oil pressure control device according to claim 1, wherein the friction engagement element is a vehicle launch clutch.

8. The oil pressure control device according to claim 2, wherein the friction engagement element is a vehicle launch clutch.

9. The oil pressure control device according to claim 3, wherein the friction engagement element is a vehicle launch clutch.

10. The oil pressure control device according to claim 4, wherein the friction engagement element is a vehicle launch clutch.

11. The oil pressure control device according to claim 5, wherein the friction engagement element is a vehicle launch clutch.

12. The oil pressure control device according to claim 6, wherein the friction engagement element is a vehicle launch clutch.

* * * * *